United States Patent [19]

Parker

[11] 4,222,806
[45] Sep. 16, 1980

[54] METHOD OF COVERING TENNIS BALLS

[75] Inventor: Roy B. Parker, Monmouth, Mass.

[73] Assignee: Albany International Corp., Albany, N.Y.

[21] Appl. No.: 2,206

[22] Filed: Jan. 9, 1979

Related U.S. Application Data

[63] Continuation-in-part of Ser. No. 914,257, Jun. 9, 1978, abandoned, which is a continuation-in-part of Ser. No. 819,254, Jul. 27, 1977, abandoned.

[51] Int. Cl.$^2$ ............................................. B29C 17/04
[52] U.S. Cl. ............................... 156/213; 156/308.2; 273/61 B
[58] Field of Search .......................... 273/61 R, 61 B; 156/213, 306, 309, 148, 296

[56] References Cited

U.S. PATENT DOCUMENTS

| | | | |
|---|---|---|---|
| 3,366,529 | 1/1968 | Olson | 156/148 |
| 3,420,731 | 1/1969 | Kuhn | 156/306 |
| 3,454,442 | 7/1969 | Heller, Jr. | 156/309 |
| 3,531,365 | 9/1970 | Melin | 156/273 |
| 3,558,413 | 1/1971 | Wall | 273/61 B |
| 3,616,131 | 10/1971 | Kardick | 156/296 |
| 3,650,874 | 3/1972 | Job et al. | 156/309 |
| 3,684,284 | 8/1972 | Tranfield | 273/61 B |
| 3,822,144 | 7/1974 | Taylor | 156/309 |

FOREIGN PATENT DOCUMENTS 1152240  5/1969  United Kingdom.

Primary Examiner—David A. Simmons
Attorney, Agent, or Firm—Kane, Dalsimer, Kane, Sullivan & Kurucz

[57] ABSTRACT

The disclosure is of a method of adhering a textile tennis ball cover to a tennis ball core. The method comprises providing a core and a textile tennis ball cover for the core. A hot-melt adhesive is also provided as a structural component of the cover material. The cover is assembled on the core and the hot-melt adhesive component caused to melt and form a bond between core and covering material. Upon re-solidifying, the adhesive adheres the cover to the core of the tennis ball with a high degree of tenacity.

2 Claims, 6 Drawing Figures

METHOD OF COVERING TENNIS BALLS

CROSS-REFERENCE TO RELATED APPLICATIONS

This application is a continuation-in-part of copending U.S. application Ser. No. 914,257 filed June 9, 1978, now abandoned and which was a continuation-in-part of U.S. application Ser. No. 819,254 filed July 27, 1977, and now abandoned.

BACKGROUND OF THE INVENTION

1. Field of the Invention

The invention relates to methods of adhering textile covers to spherical objects and more particularly relates to methods of covering tennis balls with textile fabrics.

2. Brief Description of the Prior Art

A commercial prior art process of adhering a textile cover to a tennis ball core is shown diagrammatically in FIG. 1 of the accompanying drawings. In the conventional process (shown in the FIG. 1), the cover fabric is coated with one component of a two-part latex adhesive, and the core (pinky) is coated with the second component. An array of identical dumbbell-shaped pieces is cut from the adhesive-coated fabric and the remaining fabric is removed as waste. The dumbbell-shaped pieces are stacked in register and the stack is clamped and dipped in a latex bath so that the edges of the individual pieces are coated. After separation of this stack of pieces, the adhesive-coated core and two of the adhesive-backed and edge seam-coated dumbbells are assembled to form a complete ball. The assembled balls are cured in heated molds for approximately ten minutes, during which time the adhesive bond between the cover and the core is developed, and the seam is thereby formed. The overall process involves three distinct coating and drying steps, an elaborate and time-consuming assembly and disassembly routine for the stack of pieces, and a slow cure cycle for the assembled ball.

The method of the present invention simplifies the covering of tennis balls, reducing the number of steps previously required and eliminating the need for solvent based adhesives. The use of solvents requires an additional step of driving the solvent off into the atmosphere. Release of solvents into the atmosphere is of course an undesirable occurrence. In addition, the slow cure cycle is eliminated. Other advantages of the method of the invention will be described more fully hereinafter.

Representative of prior art teachings in the literature are those found in U.S. Pat. Nos. 2,652,094; 3,558,413; and 3,684,284; see also British Patent Specification No. 1,152,240.

SUMMARY OF THE INVENTION

The invention comprises a method of adhering a textile tennis ball cover to a tennis ball core, which comprises;
  providing a tennis ball core;
  providing a textile tennis ball cover of a cut, dimension and configuration to cover said core, said textile comprising a fabric including yarns fabricated from a hot-melt adhesive composition or a heat-activated adhesive;
  assembling said cover on said core;
  causing said adhesive yarns to melt and form a bond between said core and said cover; and
  allowing said melt to solidify, whereby said cover is adhered to said core.

The term "core" as used herein is synonymous with the term "pinky" as commonly used in the art.

DETAILED DESCRIPTION OF THE PREFERRED EMBODIMENTS OF THE INVENTION

A complete understanding of the process of the invention may be obtained by a reading of the following description in conjunction with the drawings of FIGS. 2-6, inclusive.

Figure 1:
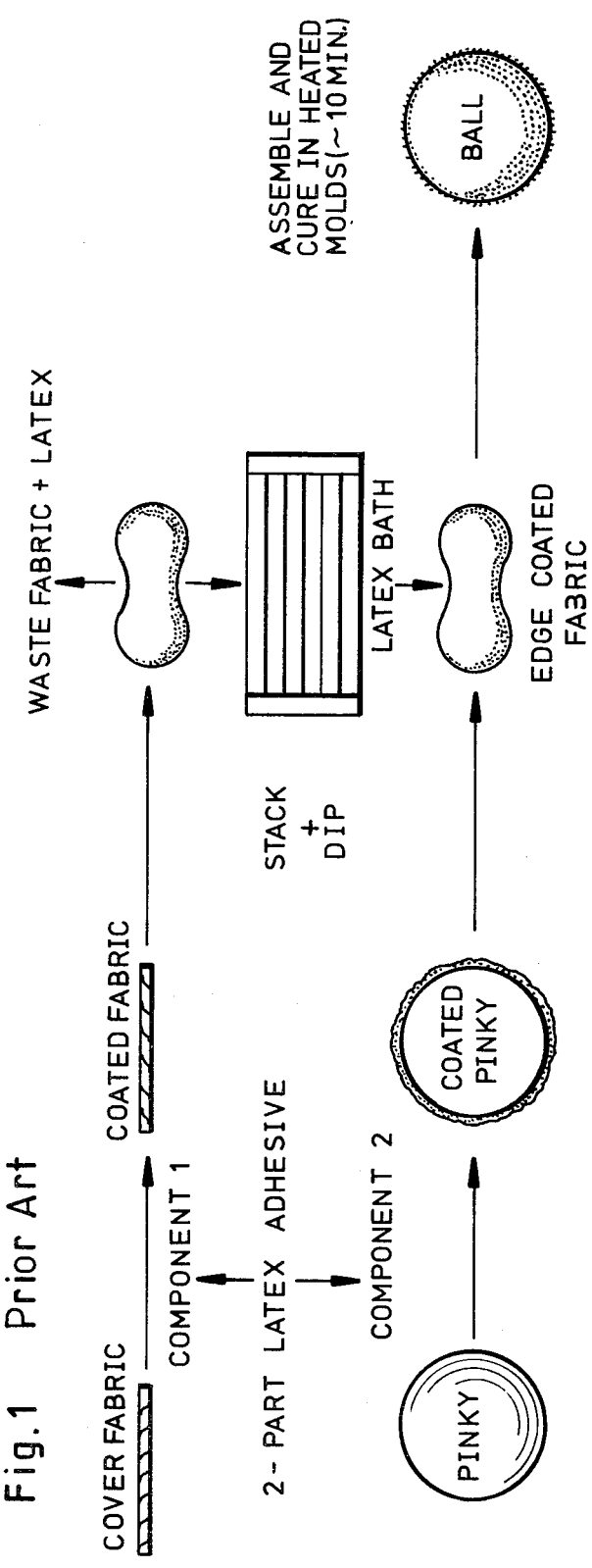
FIG. 1 is a schematic representation of a commercial prior art process for covering a tennis ball.
Figure 3:
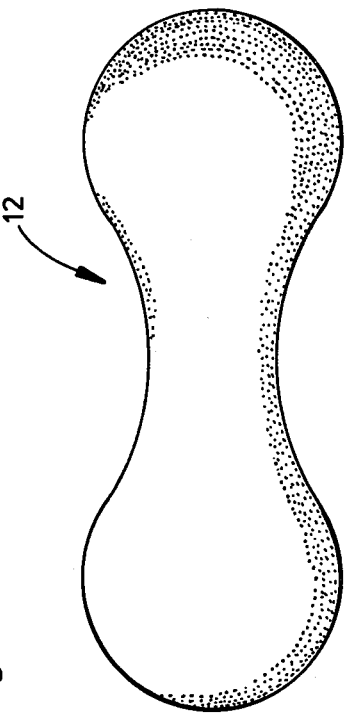
FIG. 3 is a view of a portion of the cover to be applied to a tennis ball core by the method of the invention.
Figure 2:
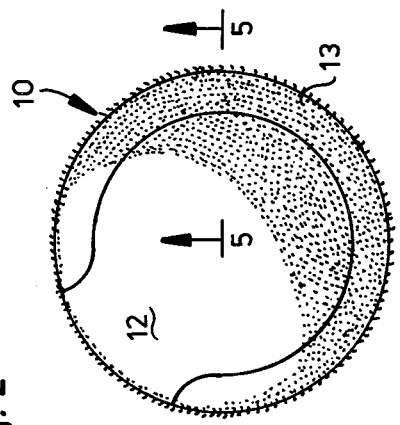
FIG. 2 is a side view of a tennis ball, covered by the method of the invention.
Figure 4:
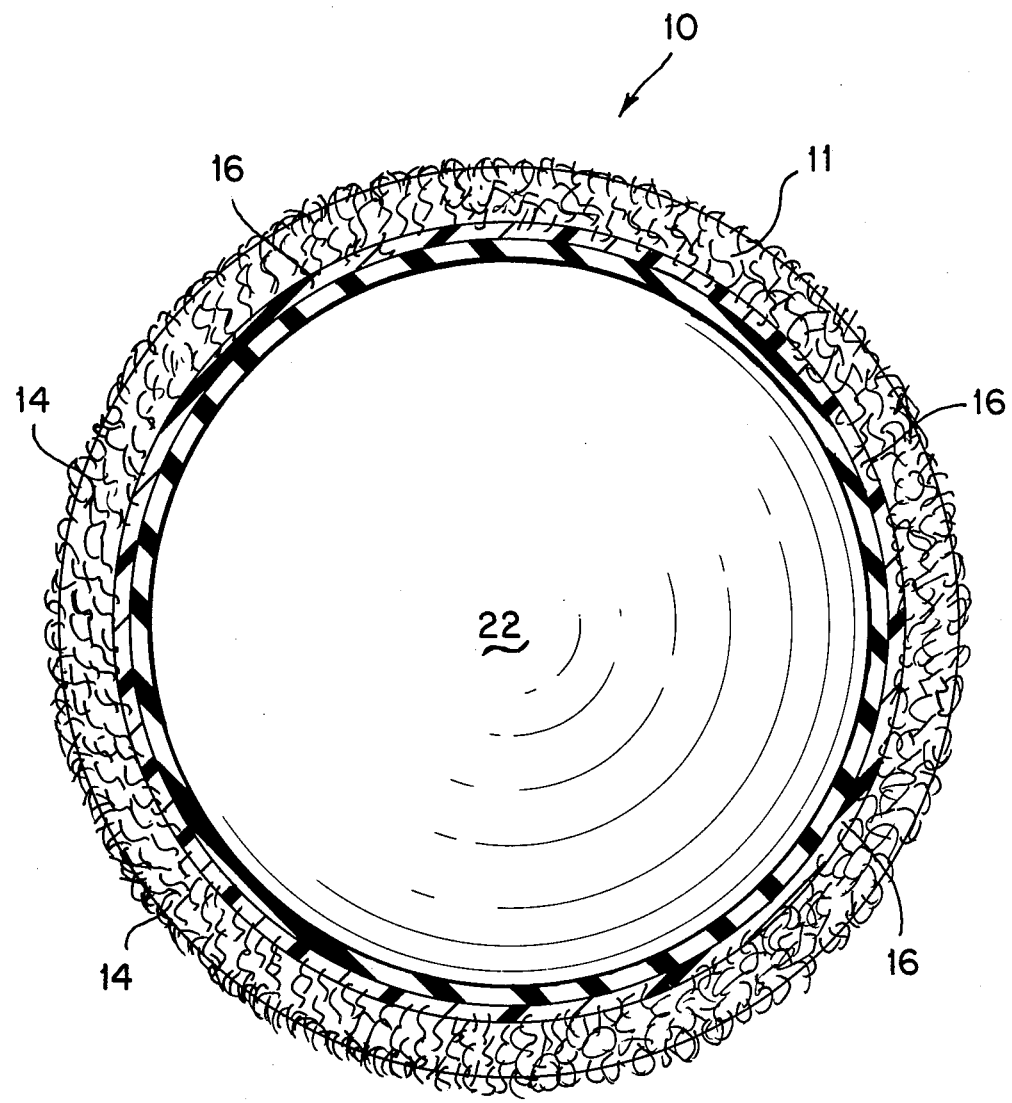
FIG. 4 is a cross-sectional side elevation of an embodiment tennis ball cover.
Figure 6:
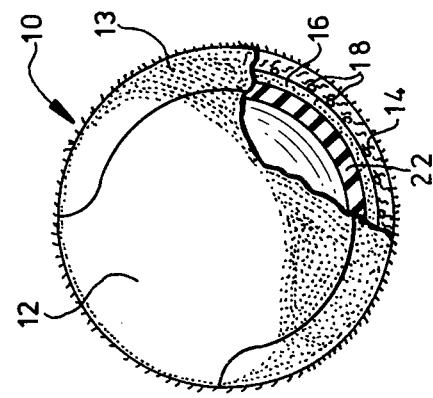
FIG. 6 is a view of the ball seen in FIG. 2, but partially cut away to show the adhered cover.

FIG. 2 is a side view of a tennis ball 10 covered with two identical cut pieces 12 and 13 of a textile fabric. Each piece 12, 13 has the "dumbbell" configuration of the piece 12 shown unmounted in FIG. 3. The two "dumbbell" shaped pieces interlock to form a sphere as shown in FIG. 2 and as is appreciated by those skilled in the art. According to the method of the invention, the covering pieces 12, 13 are cut from a textile fabric which includes as a structural component or part of the fabric, a hot-melt adhesive. Referring to FIG. 4, a cross-sectional side elevation of the embodiment ball 10 with textile fabric tennis ball covering 12, 13, one may see a web 11 of non-woven, staple textile fibers 14 needled to a woven sheet which consists of warp yarns 16 and weft yarns 18. In the FIG. 4, the warp yarns 16 are shown as having been melted and resolidified to form an adhesive bond with Core 22. The nature of the weave is not important and it may be a simple, single layer weave or a multi-layer weave. Needled, composite fabric employed as coverings for tennis balls are well known; see for example U.S. Pat. No. 3,684,284. The techniques of needling non-woven webs of fibrous materials to woven fabrics are so well known that details need not be given here; see for example the disclosure of U.S. Pat. No. 3,684,284. Generally, needling is accomplished on a needle loom with the use of barbed felting needles. The nature of the fibrous web 11 is not critical and those skilled in the art will know of fibrous webs imparting characteristics desired for the final product ball. Where one departs from the conventional fabric coverings 12, 13, used in the embodiment method of the present invention is in that structural members of the fabric coverings are formed from hot-melt adhesives, for example, the warp yarns 16 are multi-filament, staple spun, or monofilament yarns of a hot-melt adhesive composition. Such yarns, convenient for weaving are well known. Representative of such yarns are yarns of
  polyepoxides,
  polyolefins,
  polyesters,
  polyamides,
  polyurethanes, ethylene vinyl acetate polymers,
polyvinylidene chlorides,
polyvinyl butyrals,
vinyl chloride-acetate polymers,
nitrile phenolic polymers,
acrylic acid-based polymers,
styrene-butadiene copolymers,
cellulose-derived polymers,
blends thereof and the like.

If the yarns are to be melted subsequently (as will be described more fully hereinafter) with the application of dielectric heating, the adhesive yarns should also have the appropriate electrical properties.

These hot-melt adhesive yarns 16 are selected to have relatively low melt temperatures, for example within the range of from 65° to 175° C. The weft yarns 18 may be fabricated from any material having a melting point substantially above the melting point of the yarns 16. Representative of yarns 18 are polyester monofilaments of polyethylene terephthalate, and the like.

The method of the invention is carried out by first providing the coverings 12, 13 described above and a conventional tennis ball core. In the next step of the method, the covering materials 12, 13 are assembled on the tennis ball core. In the assembly, the woven fabric or scrim side of the coverings 12, 13 are positioned adjacent to the core surface to bring the adhesive yarns 16 in proximity to the core 22.

The assembly of the ball is carried out without the use of a separate adhesive applied directly to the pinky, as is done in the prior art conventional process. The assembly can often be carried out more easily if the dumbbell-shaped fabric 12, 13 pieces are preformed so that they conform more closely to the core. This preforming can be done by assembling the pieces around an insert core in a mold and heating them briefly to allow the adhesive yarns 16 to soften and deform. After assuming a curved shape and cooling, the pieces are removed from the mold and reassembled on a rubber core. While the best fit with the core is achieved if the premolding is done on a spherical form, an adequate level of fit can be achieved if the pieces are preshaped around a cylindrical form. This modification has the advantage that it can be carried out continuously by feeding the pieces 12, 13 around a heated cylindrical roller.

A seam adhesive for closing the seam between pieces 12, 13 is used in the form of a separately applied extruded strip. The seam adhesive may be of the same composition making up yarns 16. It has been found that an extruded monofilament of seam adhesive with a triangular cross-section offers advantages over a circular cross-section seam strip since this configuration gives good penetration of the seam material between the abutting pieces 12, 13 of cover fabric, and at the same time gives the external surface of the seam material the necessary width. Other cross-sectional shapes, such as a T-section would also achieve the same result. The seam adhesive strip may be assembled with the pieces 12, 13 or applied later. Following the assembly of the tennis ball coverings 12, 13 on the tennis ball core, the assembled unit may be placed in an appropriate mold or jig to hold the coverings in position. One then causes the warp yarns 16 to melt by heating them to their melt temperatures. Low melting point yarns 16 melt will migrate to the interface between the tennis ball core 22 and the covering pieces 12, 13. In migrating to the interface the melt will impregnate the fabric of the covering pieces 12, 13 in the zone adjacent to the ball core and will contact the core surface. Upon being allowed to cool, the melt will solidify and adhere the covering pieces 12, 13 to the tennis ball core. Generally, this adhesion is a strong, tenacious bond which firmly adheres the coverings 12, 13 to the core.

Melting of the hot-melt adhesive yarn 16 may be accomplished with direct application of heat, microwave energy, radio-frequency energy or like techniques. Preferably, melting is caused by the application of radio-frequency energy (RF). With RF heating the heating time can be reduced to less than one minute, compared to ten minutes that is more typical of conventional heating. This is attractive not only for the opportunity that it offers for increasing production rates, but also for the potential energy savings that can be realized. This reduces to approximately 1/10 of the prior art time taken for the bonding step. In addition, reduction of the heating times and more particularly reduction of the exposure time of the covering pieces 12, 13 and the core 22 to heat within the temperature range ordinarily required for adhesion of the covering pieces 12, 13 to core 22 provides a higher quality tennis ball product. More specifically, tennis balls prepared with minimal exposure to high temperatures will exhibit better physical properties desired for playing than balls which have been exposed to such heat for as little as 10 to 15 minutes. For example, the preferred tennis balls with minimal thermal degradation are structurally stronger, exhibit greater rebound energy and can be expected to have longer lives. The core materials continue to show better tensile and compressive strengths and the cover materials show better torsional modulus measurements in comparison to balls prepared under exposures to heat for prolonged periods of time.

If the adhesive yarns 16 are melted using RF or microwave radiation, it is necessary that the molds be relatively transparent to radiation in the applied frequency ranges. In this way the energy absorbed is concentrated mainly in the workpiece and the process efficiency is improved. Polytetrafluoroethylene is ideal for use as a mold material since it combines low dielectric loss, good mechanical workability and excellent release behavior.

Proper design of the electrodes is a factor in the preferred use of RF radiation. If an assembled ball is placed in an RF field generated by two flat parallel opposed electrodes (perhaps the simplest possible electrode configuration), the heating effect is concentrated in an equatorial zone, since this zone has the greatest amount or area of core and adhesive yarns in a direction parallel to the electrode field. It is very difficult to produce a uniform distribution of energy absorbtion throughout the entire volume of material in a hollow dielectric sphere, but the depth of the equatorial zone of high absorption can be increased by appropriate electrode design. If the width of the dumbbell shaped pieces 12, 13 can be made equal to or greater than the width of the core then the long axes of the two interlocking pieces that make up the ball cover can be aligned in turn with the equatorial plane, and the cover can be completely bonded to the core in two passes through the RF field. The desired uniformity of heating can be achieved by rotating the ball through 90° about an axis perpendicular to the field lines, between two passes through a fixed field/ by actuating in turn each of two pairs of electrodes oriented so that their field lines are perpendicular; by continuous rotation of the mold assembly; or by the provision of a rotating electric field.

Figure 5:
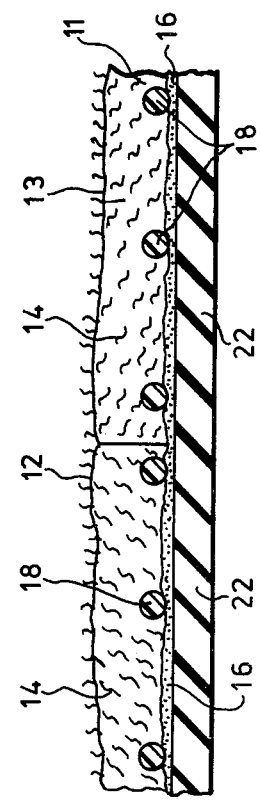
FIG. 5 is a view along lines 5—5 of FIG. 2.

Referring now to FIG. 5, a view along lines 5—5 of FIG. 2, the structure of the final tennis ball product may be seen, produced by the method of the invention. The covering pieces 12 and 13, including residual weft yarns 18 interlock with the needle fibers 14 of non-woven web 11 and are adhered to the ball core 22 by the hot-melt adhesive residue of the melted and resolidified yarns 16. The relationship of the structures in the tennis ball product of the method of the invention may be seen in FIG. 6, a partially cut-away view of the tennis ball 10 following adherence of the covering pieces 12, 13 to the core 22.

The following example describes the manner and process of making and using the invention and sets forth the best mode contemplated by the inventor of carrying out the invention but is not to be construed as limiting.

EXAMPLE 1

A "dumbbell" cut covering for a tennis ball is provided, with a rubber core. The covering piece includes as part of the base weave, a textile fabric including warp yarns of a hot-melt, polyamide adhesive having a melting point of circa 105° C. The weight of adhesive in the covering is about 12% to about 32% per weight of the total fabric covering. The covering piece is assembled on the core in an appropriate mold and heated under pressure at a temperature of 105° C. for 15 minutes. The ball is then allowed to cool to room temperature. Upon removal from the mold it is found that the ball covering is adhered to the core with a bond strength of circa 15 lbs. per inch. It is apparent that during heating the hot-melt polyamide adhesive yarns melt and then resolidify upon cooling to form the bond structure.

What is claimed is:

1. A method of adhering a textile tennis ball cover to a tennis ball core, which comprises;

providing a tennis ball core;

providing a textile tennis ball cover of a cut, dimension and configuration to cover said core, said textile comprising a fabric including yarns fabricated from a hot-melt adhesive composition;

assembling said cover on said core;

causing said adhesive yarns to melt and form a bond between said core and said cover; and allowing said melt to solidfy, whereby said cover is adhered to said core.

2. The method of claim 1 wherein said causing is carried out by heating.

* * * * *